Oct. 1, 1963 G. POTAPENKO 3,105,733
APPARATUS FOR STERILIZING AIR
Filed July 25, 1961

INVENTOR.
Gennady Potapenko
BY *Nilsson & Robbins*
ATTORNEYS 3,105,733
APPARATUS FOR STERILIZING AIR
Gennady Potapenko, Pasadena, Calif., assignor to
Reginald Robbins, Pacific Palisades, Calif.
Filed July 25, 1961, Ser. No. 126,667
7 Claims. (Cl. 21—74)

This invention relates generally to an air sterilization apparatus, and more particularly to chambers for housing a source of germicidal radiation and for providing an air flow path about the radiation source which insures an effective kill of organisms contained in air which is forced through the chamber.

This application is a continuation-in-part application from United States patent application Serial No. 817,327, filed June 1, 1959, by Gennady Potapenko and entitled "Method and System for the Prevention of the Spread of Infectious Disease by Airborne Microorganisms."

It has long been known that certain radiation is highly effective as a germicidal agent. One example of such radiation is ultraviolet radiation having a wave length of approximately 2537 Angstrom units and such ultraviolet radiation sources are commercially available. It has also been long recognized in the prior art that many disease carrying microorganisms are airborne, that is, they are transmitted from point to point by air movement within a building, room or other structure. Many attempts have been made to utilize sources of germicidal radiation and particularly ultraviolet radiation as a means to kill the airborne microorganisms which are capable of thus transmitting infectious diseases.

One such attempt was to place such sources of ultraviolet radiation at various points within a room either at the floor level, or above the level at which persons occupying the room might be situated. Although such a system was effective to kill the organisms contained in the air above this level and in the immediate vicinity of the radiation source, or at the floor level, it was ineffective with respect to the microorganisms in the remainder of the room. Furthermore, in the course of time, the ultraviolet radiation, reflected from the ceiling and from the walls, was capable of causing damage to the eyes and exposed skin area of persons occupying the room. If the sources of radiation in the system above-referred to were placed at all levels within the room, or at such a position that the ultraviolet radiation reached all parts of the room, persons occupying the room would be required to wear special clothing and masks. It is, therefore, seen that such systems are highly dangerous to individuals occupying a room in which the radiation source was thus utilized. In addition, the effectiveness of such installations was quite limited since the efficiency of kill of the organisms contained within an area is high only in the neighborhood of the source of radiation.

In applicant's copending application above-referred to there is disclosed the use of a completely enclosed source of ultraviolet radiation containing a helical baffle disposed therein. All air which is to be sterilized and injected into a given area is passed through the chamber. The baffle disposed therein provides an air flow about the source of radiation in such a manner that the kill rate of the organisms within the air is highly effective. While such apparatus is highly effective and efficient, it has been discovered that in some instances the efficiency of such a chamber is not as great as is desired for certain applications, and that the rate of air flow through such a chamber is slower in some applications than is desired.

Accordingly, it is an object of the present invention to provide an apparatus for sterilizing air which is more efficient in operation than apparatus heretofore known in the prior art.

It is another object of the present invention to provide apparatus for sterilizing air which has at a given germicidal efficiency a greater air flow capacity than prior art apparatus.

It is another object of the present invention to provide apparatus for sterilizing air which increases the germicidal capacity of a given source of germicidal radiation.

It is another object of the present invention to provide apparatus for sterilizing air which produces an air flow insuring an effective organism kill at all points within the apparatus.

Additional objects and advantages of the present invention will become apparent from a consideration of the following description taken in conjunction with the accompanying drawing which is presented by way of example only, and is not intended as a limitation upon the scope of the present invention, and in which.

In accordance with one aspect of the present invention, there is provided an apparatus for sterilizing air which includes a source of germicidal radiation. Disposed about the source of radiation is an air flow guide which is adapted to produce what is called the "divided air flow," in which one part of the air is directed about the source of radiation in a cyclonic fashion, and the other part of the air is directed along and immediately adjacent the source of radiation in a substantially axial fashion through a gap of a predetermined size provided between the source of radiation and the above-mentioned flow guide. There is also provided means for directing air into the air flow guide and into the gap and for directing air from the guide and from the gap after it has been sterilized, and into a desired space or area.

In accordance with a more specific aspect of the present invention, there is provided a substantially cylindrical chamber having a helical baffle affixed to and extending from the inner surface of the chamber. The helical baffle is provided with an opening or a gap along the axis of the cylindrical chamber. A source of germicidal ultraviolet radiation is disposed within the opening in such a manner that the portions of the helical baffle forming the opening are spaced by a predetermined amount from the surface of the ultraviolet radiation source. The helical baffle extending from the cylindrical chamber causes the cyclonic flow of air through the chamber at all points displaced from the surface of the source of radiation. The space between the source of radiation and the edge of the baffle forming the opening therethrough provides a path for the direct axial flow of air through the chamber.

In the air flowing cyclonically and in the air flowing axially as described, there will be turbulences originating mainly at the edges of the baffle, i.e. at the contact of the cyclonically moving air, and of the air moving axially. The velocity of the cyclonic air flow and of the axial flow through the chamber is predetermined in such manner that all of the air is subjected to a radiation intensity for a period of time which is sufficient to kill substantially all airborne organisms passing through the chamber.

Figure 1:
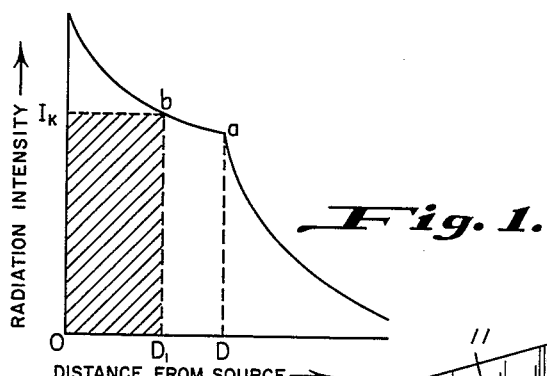
FIG. 1 is a graph illustrating intensity of radiation in relation to the distance from the source thereof in free air.

As is illustrated in the graph of FIG. 1, the intensity of radiation from a cylindrical source of germicidal ultraviolet radiation in free air is plotted along the ordinate and the distance from the surface of the source is plotted along the abscissa. Due to the cylindrical shape of the source of radiation, the intensity of radiation as shown in FIG. 1 is inversely proportional to the distance from the axis of the source up to a point D the position of which depends upon the length of the cylinder and upon the distance from its ends. Beyond the point D on the abscissa of the graph in FIG. 1, the intensity of radiation is inversely proportional to the square of the distance from the axis of the source. It can therefore be seen that when a source of germicidal ultraviolet radiation is placed in open air that the radiation intensity rapidly decreases as the distance from the axis of the source increases, especially beyond point D. If at a given exposure time the maximum distance from the axis of the source at which the radiation intensity is lethal to organisms is, for example, at a point $D_1$ and the intensity at this point is $I_k$, it can be seen that the distance at which the radiation is lethal to organisms contained within the air is relatively short. It should also be noted that only that radiation falling within the rectangle formed by the points O, $D_1$, b and $I_k$ is effectively used to kill organisms while the remainder of the radiation is effectively lost to the atmosphere. Such a system is, therefore, obviously quite inefficient.

It is also known in the prior art that the germicidal effect of the radiation for any given type of organism is determined not only by the intensity of the radiation, I, but also by the time, t, of exposure of the organism to the radiation. If the exposure time, t, is not longer than a few minutes, the germicidal effect of the radiation is proportional to the product It. When the intensity of radiation is low and the exposure lasts longer than a few minutes then the bacterial effect begins to decrease rapidly and the radiation whose intensity is below a certain minimum possesses no bacterial effect at all. In the invention disclosed in applicant's copending application, supra, this principle is utilized and all air which is directed into a desired area or space is first passed, at a predetermined exposure time, through a chamber which is completely enclosed and which contains a source of ultraviolet radiation of such an intensity that its germicidal effect is sufficiently strong to destroy practically all of the microorganisms even at the periphery of the chamber, i.e. where the intensity of the radiation is the lowest.

Figure 4:
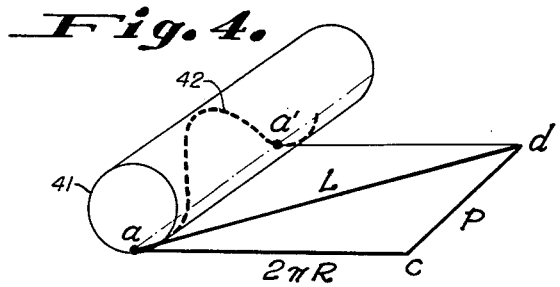
FIG. 4 is a graph illustrating the effect of helical baffle on the residence time of air inside of sterilizing apparatus in accordance with the present invention.

Applicant has now discovered that by selecting the size of the opening in the baffle positioned within a chamber in a predetermined manner the germicidal efficiency of a given source of radiation may be increased, as will be more fully explained later in references to FIG. 4.

Figure 2:
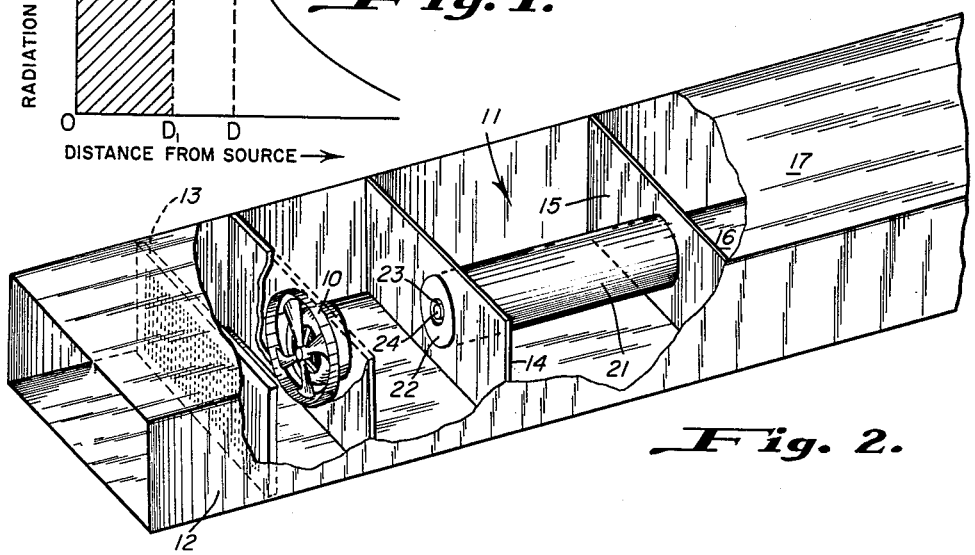
FIG. 2 is a schematic diagram, partly in cross-section, illustrating an air sterilizing apparatus in accordance with the present invention.

Referring now more particularly to FIG. 2, there is illustrated an apparatus in accordance with applicant's present invention. As is therein shown, air sterilization apparatus 11 in accordance with applicant's invention is positioned within a duct 12. The duct 12 may be a part of any air transmission apparatus known to the art. For example, duct 12 may be a portion of an air conditioning system within a building, it may be a portion of a self-contained air sterilizing apparatus, or the like. A filter 13 may be positioned within the duct 12 to remove particles of dust or other contaminants from the air. Means such as a fan or blower 10 is also positioned within the duct 12. The fan or blower 10 forces air through the duct 12 and through the air sterilizing apparatus 11. A pair of supporting and sealing members 14 and 15 are positioned within the duct 12. The members 14 and 15 operate to support the air sterilizing apparatus 11 within the duct 12 and to seal the apparatus 11 in such a manner as to cause all air which passes through duct 12 to pass only through the sterilization apparatus 11 so that all air which enters the space 16 after passing through the apparatus 11 is substantially sterilized. The end portion 17 of the duct 12 may then be connected to any desired apparatus for directing air into the desired area or space.

Air sterilization apparatus 11 includes an air guide means which, for example, may be a cylindrical chamber 21 having a baffle 22 extending from the inner surface thereof. The baffle 22 defines an opening 23 about the axis of the cylinder 12. Positioned within the opening 23 is a source of germicidal radiation which, for example, may be an ultraviolet tube 24. As is illustrated, the surface of the tube 24 does not contact the edge of the baffle 22 which defines the opening 23.

Figure 3:
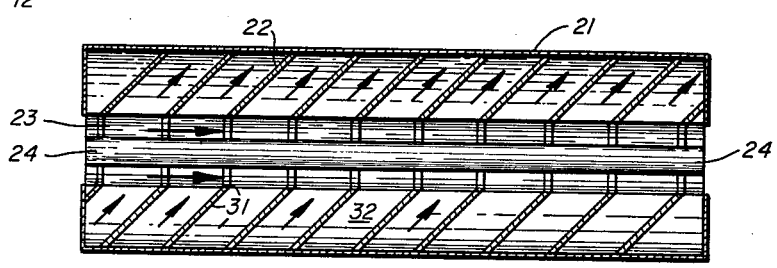
FIG. 3 is an elevational view, partly in cross-section, of a portion of the apparatus illustrated in FIG. 2.

The details of construction of the air sterilization apparatus 11 may be more clearly seen by reference to FIG. 3. As FIG. 3 shows, the baffle 22 which is preferably helical in configuration extends from the inner surface of the cylindrical chamber 21 in such a manner as to cause air which enters the chamber to pass in a cyclonic pattern in all areas spaced from the surface of the ultraviolet tube 24. It has been found that if the baffle extends to the surface of the tube 24 and all the air passing through the chamber is caused to move in the cyclonic pattern, that the air flow capacity of the chamber is reduced, and the bactericidal efficiency of the chamber is lowered. Furthermore, since the radiation intensity at the surface of the tube is much greater than at the inner surface of the cylinder 21, the time of exposure at the surface of the tube need be relatively very short. However, some turbulence should be created in the air flow to insure a complete kill of those organisms, such as staphylococci, which reproduce in clusters. Therefore, the inner edge 31 of the baffle is removed from the surface of the tube 24 by a predetermined amount to provide an axial space 23 completely surrounding the tube 24 and extending the length of the chamber. Such a configuration has been found to produce what has been earlier called the divided air flow which provides excellent results i.e. produces substantially sterile air.

Air flow is indicated by the arrows in FIG. 3 and is represented as flowing from left to right as viewed in FIG. 3. As can be seen by the arrows, a portion of the air may pass immediately adjacent the surface of the tube 24 and in an axial manner through the chamber 21. Another portion of the air is caused to sweep upward and into the space 32 between the turns of the helical baffle 22. At the contact of air which moves axially and of the air which moves cyclonically there originate turbulences which extend both into the axial and into the cyclonic air flow thus causing particles or organisms which may be contained within the air to tumble as they pass through the apparatus 11. The bulk of the air which is forced through the chamber 21 impinges against the baffle 22 and is caused to pass in a swirling or cyclonic motion through the chamber 21. It can therefore be seen that the air which passes through the chamber 21 and remote from the tube 24 has a longer residence time within the chamber, and a longer exposure time to the radiation emitted by the ultraviolet tube 24 as compared to the air immediately adjacent the tube. This fact tends to minimize the difference between the germicidal effect, as measured by the product It, in points remote from the tube 24 (smaller I, larger t) and in points adjacent to the tube 24 (larger I, smaller t).

Chamber 21 is preferably constructed of a material, the interior surface of which is highly reflective for the germicidal ultraviolet radiation. One example of such material is Alzak-Aluminum. By utilizing such material for the chamber 21, the radiation is reflected from the surface thereof and is directed back toward the tube 24. Such reflection increases the radiation intensity within the chamber 21 over that which would be available if the tube 24 were placed in free air and not enclosed. When the Alzak-Aluminum is used the increase amounts to approximately 70%.

The effect of a helical baffle upon the residence time of air within its space 32 depends upon the number of turns of the baffle. This is illustrated in FIG. 4 in which 41 is a part of the chamber and 42 is the trace of the contact of the helical baffle with the interior surface of the chamber. The line $aa'$ represents one turn of the baffle and, if $p$ is the pitch of the baffle, then the length L of line $aa'$ is given by the expression $L=\sqrt{p^2+(2\pi R)^2}$ where R is the radius of the chamber. The longest residence time for a particle of air moving in cyclonic motion through the baffle is obtained when the particle of air moves close to the interior surface of the chamber, i.e. when its path approximates line $aa'$ and when its path length is L. Without the baffle the path length of any particle of air moving close to the interior surface of the chamber would equal $p$. Therefore, the baffle lengthens the path length and it may increase the residence time as much as $L/p=\sqrt{1+(2\pi R/p)^2}$. The ratio $R/p$, at a given R, depends upon $p$ i.e. upon the number of turns of the baffle per unit length of the chamber. In the typical case of a chamber 36 inches in length and 6½ inches inside diameter, with a helical baffle of 6 turns, the residence time may be increased as much as 3 times. A larger number of turns will provide a greater increase in the residence time.

In practice the length and the diameter of chamber, the number of turns of helical baffle, the size of opening 23, FIG. 3, and the rate of air flow through the chamber are chosen experimentally to produce the largest germicidal effect.

In utilizing a cylindrical chamber 36 inches long and having a diameter of six and one-half inches, and with a baffle of 6 turns having ¾ inch opening between the ultraviolet tube and the helical baffle, and utilizing an ultraviolet tube having a diameter of three-quarter inches and emitting approximately 10 watts of ultraviolet energy, a lethal efficiency of better than 99.9% was obtained at the air flow rate of 100 cubic feet per minute through the chamber.

Bactericidal efficiency of the chamber above described was tested by nebulizing 1.5 ml. of suspension of *Escherichia coli* B containing approximately $6\times10^6$ bacteria into the intake of the chamber. After passage through the chamber and at the exhaust thereof, it was found that only 2 viable organisms were recovered from 12 cubic feet of air sampled. In another typical experiment 1.1 ml. of suspension of *Staphylococcus albus* containing $3.3\times10^6$ bacteria was nebulized into the intake and 5 bacteria recovered from 10 cubic feet of air sampled at the exhaust.

There has been thus disclosed apparatus for sterilizing air which is more efficient in operation both as to utilization of a greater amount of the radiation from a source of germicidal radiation and as to air flow. Therefore, such apparatus increases the capacity of a system while it insures the effective killing of all organisms suspended within the air passing into a desired space or area.

What is claimed is:

1. Apparatus for providing a flow of substantially sterile air comprising an air duct, means disposed within said air duct and defining an opening therethrough for producing turbulence in said air flow, a source of germicidal radiation disposed within said opening and spaced from said turbulence producing means to provide an unimpeded gap adjacent the surface of said source, means for directing air into said duct, and means for directing air from said duct to a desired space, thereby providing a substantially unimpeded airflow through said means within said duct immediately adjacent said source and a turbulent airflow throughout the remainder thereof.

2. Apparatus for providing a flow of substantially sterile air comprising a source of germicidal radiation, air flow guide means disposed about said source of radiation but spaced therefrom in a non-contacting relationship therewith, said air flow guide means being adapted to direct air in a turbulent fashion about said radiation source, said space adjacent said source being adapted to direct air along said source in a substantially unimpeded non-turbulent fashion, means for directing air into said air flow guide means, and means for directing substantially sterile air from said air flow guide means into a desired space.

3. Apparatus according to claim 2 in which said air flow guide means is a substantially cylindrical member having a helical baffle affixed to and extending from the inner surface thereof and said source of radiation is an ultraviolet lamp.

4. Apparatus for providing a flow of substantially sterile air comprising an elongated hollow member, a helical baffle affixed to said inner surface of said hollow member and extending substantially the entire length thereof, said baffle defining an opening of a predetermined size therethrough along the longitudinal axis of said hollow member, a source of germicidal radiation disposed within said opening and having a surface spaced from that portion of said baffle defining said opening, means for forcing air through said hollow member, said helical baffle producing a lengthening of residence time for said air flow in said member spaced from said source of radiation, said opening providing a substantially unimpeded air flow adjacent said source.

5. Apparatus according to claim 4 in which said opening is spaced from the surface of said radiation source a distance no greater than that point at which the radiation intensity from said source is effective to kill microorganisms passing through said member in a time equal to the length of the apparatus divided by the linear velocity of the axially flowing air.

6. A chamber containing a source of ultraviolet radiation for use in combination with a system for providing a forced flow of substantially sterile air to a predetermined space, said chamber comprising a hollow member, a baffle extending from the inner surface of said hollow member for causing a cyclonic flow of air through said baffle, an ultraviolet germicidal lamp disposed within said hollow member, said baffle being spaced from the surface of said lamp to provide an unimpeded opening through said member, whereby an unimpeded axial flow path for said forced air flow is provided adjacent said lamp.

7. Apparatus according to claim 6 in which said member is substantially cylindrical and said baffle is helical and is affixed to the inner surface of said cylinder.

References Cited in the file of this patent
UNITED STATES PATENTS

| | | |
|---|---|---|
| 2,413,704 | Glatthar et al. | Jan. 7, 1947 |
| 2,732,501 | Blaeker | Jan. 24, 1956 |
| 2,747,101 | Hammond | May 22, 1956 |
| 3,011,230 | Potapenko | Dec. 5, 1961 |